(12) United States Patent
Oliver et al.

(10) Patent No.: US 6,419,058 B1
(45) Date of Patent: Jul. 16, 2002

(54) MAGNETORHEOLOGICAL DAMPER WITH PISTON BYPASS

(75) Inventors: Michael Leslie Oliver, Xenia; William Charles Kruckemeyer, Beavercreek; Eric Lee Jensen, Dayton, all of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/823,267

(22) Filed: Mar. 30, 2001

(51) Int. Cl.[7] ................................................. F16F 9/53
(52) U.S. Cl. .................. 188/267.2; 188/267.1
(58) Field of Search ........................... 188/267.1, 267.2; 267/140.14, 140.15

(56) References Cited

U.S. PATENT DOCUMENTS

| | | | |
|---|---|---|---|
| 5,284,330 A | * 2/1994 | Carlson et al. | ........ 267/140.14 |
| 5,333,708 A | 8/1994 | Jensen et al. | |
| 5,510,988 A | 4/1996 | Majeed et al. | |
| 5,632,361 A | * 5/1997 | Wulff et al. | ............. 188/267.2 |
| 6,095,486 A | 8/2000 | Ivers et al. | |
| 6,131,709 A | * 10/2000 | Jolly et al. | ............... 188/267.2 |
| 6,151,930 A | 11/2000 | Carlson | |
| 6,158,470 A | 12/2000 | Ivers et al. | |
| 6,161,662 A | 12/2000 | Johnston et al. | |
| 6,260,675 B1 | * 7/2001 | Muhlenkamp | ........... 188/267.2 |
| 6,279,701 B1 | * 8/2001 | Namuduri et al. | ....... 188/267.2 |
| 6,311,810 B1 | * 11/2001 | Hopkins et al. | ......... 188/267.2 |

FOREIGN PATENT DOCUMENTS

| | | | |
|---|---|---|---|
| DE | 19820570 | * | 11/1999 |
| JP | 9-303473 | * | 11/1997 |

* cited by examiner

Primary Examiner—Christopher P. Schwartz
(74) Attorney, Agent, or Firm—Scott A. McBain

(57) ABSTRACT

A magnetorheological damper includes a cylinder and a magnetorheological piston. The magnetorheological piston is located within and slideably engages the cylinder. The magnetorheological piston includes a magnetically energizable passageway and a magnetically non-energizable passageway spaced apart from the magnetically energizable passageway. The magnetorheological piston also includes a pressure and flow control valve disposed to allow pressure-dependent fluid flow in the magnetically non-energizable passageway when the magnetorheological piston slides towards the first end of the cylinder.

14 Claims, 3 Drawing Sheets

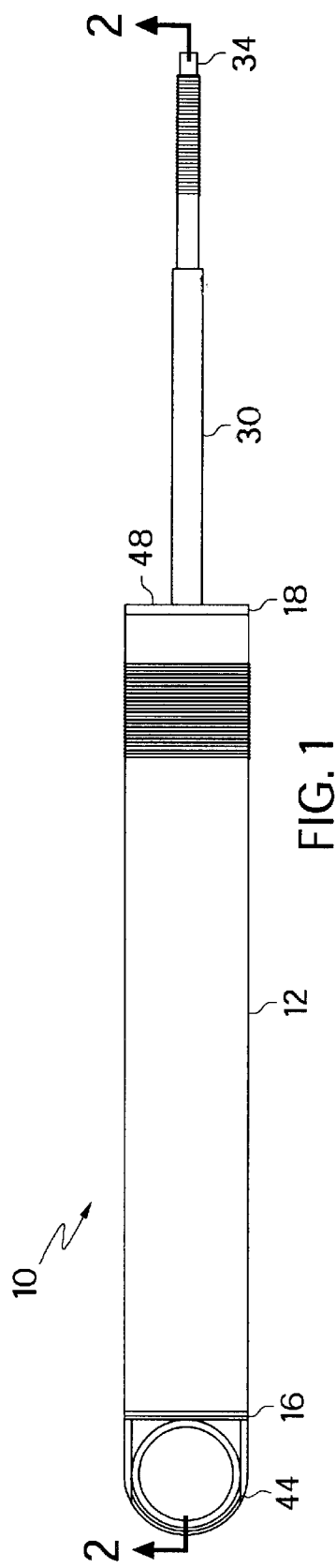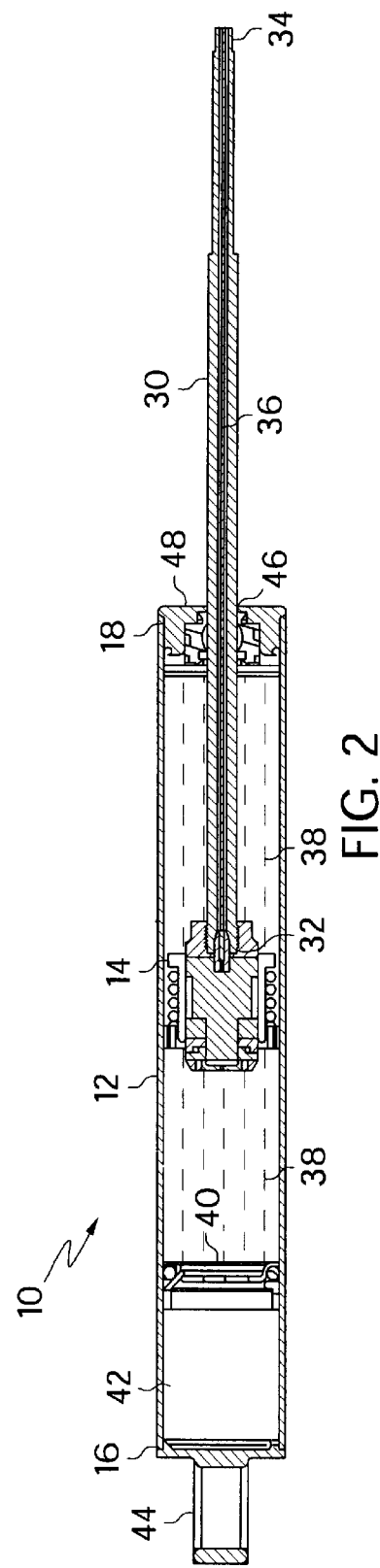

MAGNETORHEOLOGICAL DAMPER WITH PISTON BYPASS

TECHNICAL FIELD

The present invention relates generally to piston dampers, and more particularly to a magnetorheological (MR) damper.

BACKGROUND OF THE INVENTION

Conventional piston dampers include MR dampers having a cylinder containing an MR fluid and having an MR piston which slideably engages the cylinder. The MR fluid passes through an orifice of the MR piston. Exposing the MR fluid in the orifice to a varying magnetic field, generated by providing a varying electric current to an electric coil of the MR piston, varies the damping effect of the MR fluid in the orifice providing variably-controlled damping of relative motion between the MR piston and the cylinder. The electric current is varied to accommodate varying operating conditions, as is known to those skilled in the art. A rod has a first end attached to the MR piston and a second end extending outside the cylinder. The cylinder and the rod are attached to separate structures to dampen relative motion of the two structures along the direction of piston travel.

A known design includes an MR piston having a magnetically energizable passageway and a magnetically non-energizable passageway, wherein the magnetically non-energizable passageway includes a check valve which is in either a valve closed position or a valve open position. The check valve blocks flow in one direction (usually when the rod moves more outward from the cylinder). The check valve allows flow in the other direction (usually when the rod moves more inward into the cylinder). This allows the MR damper to exert a different damping effect depending on the direction of rod travel.

What is needed is a magnetorheological damper having more finely-tuned damping.

SUMMARY OF THE INVENTION

In a first expression of a first embodiment of the invention, a magnetorheological damper includes a cylinder and a magnetorheological piston. The cylinder has first and second ends. The magnetorheological piston is located within, and slideably engages, the cylinder. The magnetorheological piston includes a magnetically energizable passageway and a magnetically non-energizable passageway spaced apart from the magnetically energizable passageway. The magnetorheological piston also includes a pressure and flow control valve disposed to allow pressure-dependent fluid flow in the magnetically non-energizable passageway when the piston slides towards the first end of the cylinder. In one example, the valve blocks fluid flow in the magnetically non-energizable passageway when the piston slides away from the first end of the cylinder.

In a second expression of a first embodiment of the invention, a magnetorheological damper includes a cylinder, a magnetorheological piston, and a magnetorheological fluid. The cylinder has first and second ends. The magnetorheological piston is located within, and slideably engages, the cylinder. The magnetorheological piston includes a magnetically energizable passageway and a magnetically non-energizable passageway spaced apart from the magnetically energizable passageway. The magnetorheological piston also includes a pressure and flow control valve disposed to allow pressure-dependent fluid flow in the magnetically non-energizable passageway when the piston slides towards the first end of the cylinder. A portion of the magnetorheological fluid is located in the magnetically energizable and non-energizable passageways. In one example, the valve blocks fluid flow in the magnetically non-energizable passageway when the piston slides away from the first end of the cylinder.

Several benefits and advantages are derived from the invention. The pressure and flow control valve allows pressure-dependent fluid flow in one direction meaning the valve allows for delayed valve opening until a minimum pressure is experienced, allows for full valve opening when a maximum pressure is experienced, and allows for pressure-dependent partial valve opening when a pressure between the minimum and maximum pressures is experienced. This provides for more finely-tuned damping.

SUMMARY OF THE DRAWINGS

FIG. 1 is an exterior view of a first embodiment of the magnetorheological damper of the invention;

FIG. 2 is a cross-sectional view of the magnetorheological damper of FIG. 1 taken along lines 2—2 of FIG. 1;

DESCRIPTION OF THE PREFERRED EMBODIMENT

Figure 3:
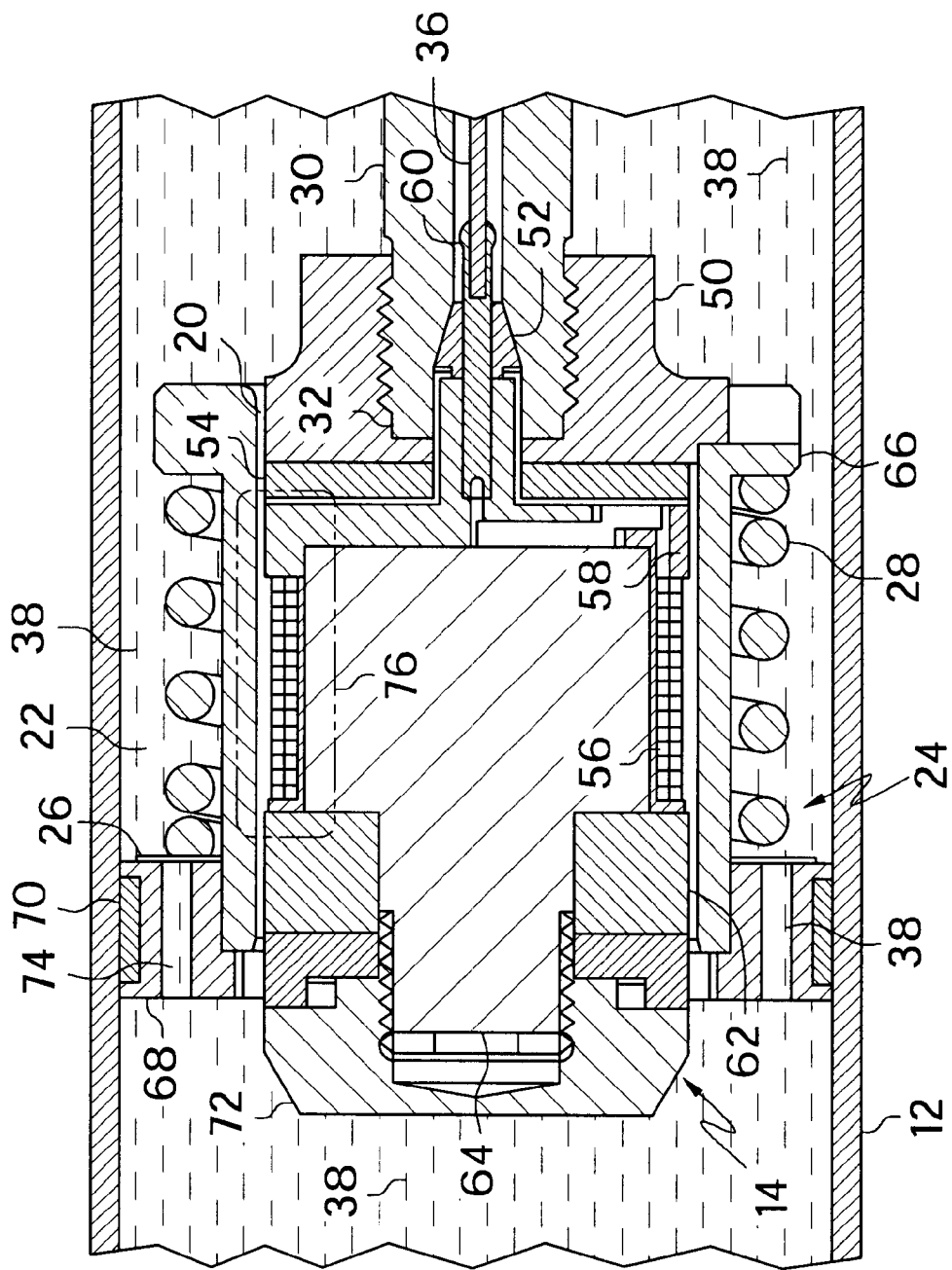
FIG. 3 is an enlarged cross-sectional view showing the magnetorheological piston of the magnetorheological damper of FIG. 2.

Referring now to the drawings, wherein like numerals represent like elements throughout, FIGS. 1 through 4 show a first embodiment of the magnetorheological damper 10 of the present invention. An application of the magnetorheological damper 10 is its use as a shock absorber for an automobile, an airplane, or other type of vehicle. Another application is use of the magnetorheological damper 10 to provide motion resistance on exercise equipment such as stair climbers and rowing machines. A further application is use of the magnetorheological damper 10 to provide motion isolation for a building, bridge, or other structure subject to earthquakes. An additional application is use of the magnetorheological damper 10 to dampen vibrations encountered by vehicles and structures in outer space. Other applications are left to the artisan.

In a first expression of the first embodiment of the invention shown in the figures, the magnetorheological damper 10 includes a cylinder 12 and a magnetorheological piston 14. It is noted that a magnetorheological piston is a piston which includes a passageway and which is adapted for creating a magnetic field in the passageway. The cylinder 12 has first and second ends 16 and 18. The magnetorheological piston 14 is disposed within, and slideably engages, the cylinder 12. The magnetorheological piston 14 includes a magnetically energizable passageway 20 and a magnetically non-energizable passageway 22 spaced apart from the magnetically energizable passageway 20. The magnetorheological piston 14 also includes a pressure and flow control valve 24 disposed to allow pressure-dependent fluid flow in the magnetically non-energizable passageway 22 when the magnetorheological piston 14 slides towards the first end 16 of the cylinder 12. It is noted that a pressure and flow control valve is a valve which allows pressure-dependent fluid flow in one direction meaning the valve allows for a delayed valve opening until a minimum pressure is experienced, allows for full valve opening when a maximum pressure is experienced, and allows for pressure-dependent partial valve opening when a pressure between the minimum and maximum pressures is experienced. It is further noted that some pressure and flow control valves also have a fixed orifice.

In a first example of the first expression, the valve 24 blocks fluid flow in the magnetically non-energizable passageway 22 when the magnetorheological piston 14 slides away from the first end 16 of the cylinder 12. In the first example, the valve 24 would also block fluid flow in the magnetically non-energizable passageway 22 when the magnetorheological piston 14 slides towards the first end 16 of the cylinder 12 when a pressure less than a minimum valve-opening pressure is experienced. In one construction of the first example, the valve 24 has a check-valve member 26 disposed to block fluid flow in the magnetically non-energizable passageway 22 when the magnetorheological piston 14 slides away from the first end 16 of the cylinder 12, and the valve 24 has a spring member 28 operatively engaging the check-valve member 26 to allow pressure-dependent fluid flow in the magnetically non-energizable passageway 22 when the magnetorheological piston 14 slides towards the first end 16 of the cylinder 12. In a second example, not shown, the valve 24 also has a fixed orifice which allows fluid flow in both directions at any pressure.

In a first design of the first expression, the magnetorheological damper 10 of claim 1, also includes a rod 30 having a first end 32 attached to the magnetorheological piston 14 and having a second end 34 extending outside the cylinder 12. In the first design, the second end 18 of the cylinder 12 is disposed between the first and second ends 32 and 34 of the rod 30. Also in the first design, the rod 30 contains an electrode 36 operatively connected to the magnetorheological piston 14.

In one implementation of the first expression, the magnetically energizable passageway 20 is a valveless passageway. It is noted that a valveless passageway is a passageway which has no variable physical restriction to fluid flow in the passageway.

In one illustration of the first expression, the cylinder 12 has the shape of a substantially right-circular cylinder. Other shapes of the cylinder are left to the artisan.

In a second expression of the first embodiment of the invention shown in the figures, the magnetorheological damper 10 includes a cylinder 12, a magnetorheological piston 14, and a magnetorheological fluid 38. The cylinder 12 has first and second ends 16 and 18. The magnetorheological piston 14 is disposed within, and slideably engages, the cylinder 12. The magnetorheological piston 14 includes a magnetically energizable passageway 20 and a magnetically non-energizable passageway 22 spaced apart from the magnetically energizable passageway 20. The magnetorheological piston 14 also includes a pressure and flow control valve 24 disposed to allow pressure-dependent fluid flow in the magnetically non-energizable passageway 22 when the magnetorheological piston 14 slides towards the first end 16 of the cylinder 12. The magnetorheological fluid 38 is disposed in the cylinder 12. It is noted that a magnetorheological fluid is a fluid which exhibits Bingham plastic behavior in the presence of a magnetic field, as can be appreciated by those skilled in the art. A non-limiting example of a magnetorheological fluid is oil containing suspended fine iron particles. A portion of the magnetorheological fluid 38 is disposed in the magnetically energizable and the magnetically non-energizable passageways 20 and 22. It is noted that the magnetorheological fluid 38 in the magnetically non-energizable passageway 22 is essentially magnetically unaffected by the magnetorheological piston 14. All of the previously-described examples, constructions, designs, implementations, and illustrations of the first expression are equally applicable to the second expression of the magnetorheological damper 10 shown in the figures.

As can be appreciated by those skilled in the art, in a first variation of the previously-described first and/or second expression of the magnetorheological damper 10, an outer tube (not shown) surrounds the cylinder 12, and a valve provides fluid communication between the outer tube and the cylinder. The first variation provides a twin-tube damper which operates at a lower gas charge, as can be appreciated by the artisan.

Several benefits and advantages are derived from the invention. The pressure and flow control valve allows pressure-dependent fluid flow in one direction meaning the valve allows for delayed valve opening until a minimum pressure is experienced, allows for full valve opening when a maximum pressure is experienced, and allows for pressure-dependent partial valve opening when a pressure between the minimum and maximum pressures is experienced. This provides for more finely-tuned damping.

In a first representation of either or both of the previously-described first and second expressions, the magnetorheological damper 10 is employed as a vehicle suspension damper used to control vehicle ride and handling including damping during jounce (compression of damper) and rebound (extension of damper). It is found (by experience) that it is desirable to have jounce damping at approximately one third the level of rebound damping.

In the magnetorheological damper 10, damping is externally controlled. The range of damping available from the magnetically energizable passageway 20 is the same for jounce and rebound. The magnetorheological damper 10 employs a magnetically non-energizable passageway 22 to bypasses some of the fluid away from the magnetically energizable passageway 20 during jounce damping. This will allow jounce and rebound control within ranges that are tuned to reflect typical damping requirements and make more effective the control range available in the damper.

In the first representation, the magnetorheological damper 10 also includes a floating gas cup 40 disposed in the cylinder 12 between the magnetorheological piston 14 and the first end 16 of the cylinder 12 and also includes a compressed gas 42 disposed in the cylinder 12 between the gas cup 40 and the first end 16 of the cylinder 12. In one choice of materials, the gas 42 consists essentially of air. The cylinder 12 has a hollow interior, has a vehicle attachment 44 at its first end 16 and has an opening 46 at its second end 18 for the rod 30. The inside surface of the cylinder 12 is cylindrical and smooth. The magnetorheological piston 14 slides on the inside surface of the cylinder 12, and the rod 30 projects out the opening 46 and is sealed at the second end 18 of the cylinder 12 by a seal and rod guide assembly 48. The second end 34 of the rod 30 is also an attachment. The gas cup 40 is sealed to the interior surface of the cylinder 12 and can slide in the cylinder 12. The interior of the cylinder 12 between the gas cup 40 and the second end 18 of the cylinder 12 is filled with the magnetorheological fluid 38. The interior of the cylinder 12 between the gas cup 40 and the first end 16 of the cylinder 12 is filled with the compressed gas 42.

When the magnetorheological damper of the first representation is stroked, damping fluid is forced through the magnetically energizable passageway 20 (and through the magnetically non-energizable passageway 22 during jounce) providing flow damping and therefore motion damping. The compressed gas 42 presses the gas cup 40 towards the magnetorheological fluid 38, pressurizing the magnetorheological fluid 38, and making the magnetorheological damper 10 resistant to fluid cavitation. Also, when the magnetorheological damper 10 is stroked, the rod 30 displaces magnetorheological fluid 38 inside the cylinder 12 causing the gas cup 40 to move. For example, as the magnetorheological damper 10 is stroked shorter, the gas cup 40 is forced toward the first end 16 of the cylinder 12.

Figure 4:
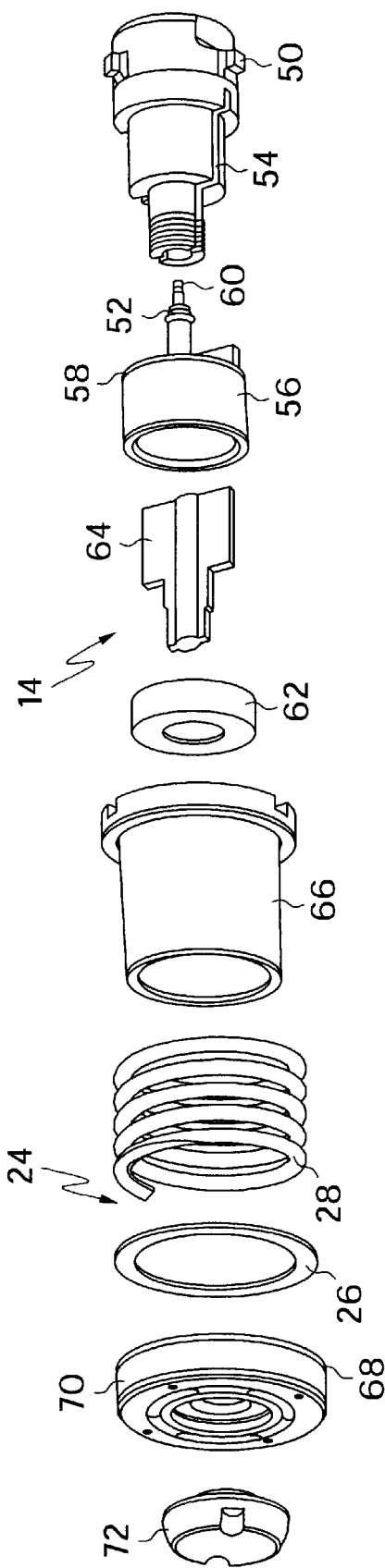
FIG. 4 is an exploded perspective view of the pressure and flow control valve of the magnetorheological damper of FIGS. 2 and 3.

Referring to the first representation as shown in FIGS. 3 and 4, The rod 30 connects to one end of the magnetorheological piston 14 by being threaded into the piston adapter 50 that supports piston parts and is constructed of non-magnetic material (such as stainless steel) to isolate the rod 30 from magnetic fields created in the magnetorheological piston 14. The electrode (or conductor) 36 provides a path to an external electrical connector (not shown). This circuit is completed by the electrical path supplied by the rest of the structure (other electrical connections being omitted from the figures for clarity). The seal 52 prevents fluid leakage through the passage provided for the electrode (conductor) 36. The magnetic core 54 is attached to the piston adapter 50 typically by brazing. The magnetic core 54 is magnetically soft and provides part of the path for the magnetic field set up by the coil 56. The bobbin 58 provides for winding the coil 56 and supports the connector 60 which is crimped to retain the electrode (conductor) 36. The pole 62 is also magnetically soft and is another part of the magnetic path. The filler 64 is magnetically soft and increases the magnetic area available inside the coil 56. The piston shell 66 is magnetically soft and is part of the magnetic field. The piston end support 68 holds the piston band 70 that provides a bearing for piston movement against the cylinder 12. The piston end support 68 contains passages (i.e., portions of the magnetically energizable and magnetically non-energizable passageways 20 and 22) for magnetically-controlled flow and for bypass flow and retains other piston parts when secured by the nut 72. The nut 72 and the piston end support 68 are of nonmagnetic material, such as stainless steel. The check valve member (valve disc) 26 and the spring member 28 provide for pressure regulated one-way flow through the holes 74 (which form a part of the magnetically non-energizable passageway 22) in the piston end support 68. The check-valve member (valve disc) 26 and the spring member 28 are of nonmagnetic material, such as stainless steel.

When the magnetorheological damper 10 of the first representation is stroked, magnetorheological fluid 38 flows through the magnetically energizable passageway 20 and is subject to magnetic control. When no electric current is supplied to the coil 56, the only damping applied in the magnetically energizable passageway 20 is due to the physical size restriction of the magnetically energizable passageway 20. When the coil 56 is energized, a magnetic field (indicated by dashed line 76) is set up and the magnetorheological fluid 38 subject to magnetic flux in the magnetically energizable passageway 20 becomes more plastic, resisting flow through the magnetically energizable passageway 20. This increases the amount of damping supplied by the magnetorheological damper 10. The electric current is varied (which varies the damping effect of the magnetorheological fluid 38 in the magnetically energizable passageway 20) to accommodate varying operating conditions, as is known to those skilled in the art.

During a rebound stroke, operation of the magnetorheological damper 10 is the same as described in the previous paragraph. During a compression stroke, if the force causing the stroke is large enough to generate sufficient fluid pressure across the magnetorheological piston 14, the check-valve member (valve disc or plate) 26 held against the piston end support 68 will deflect the spring member 28 allowing fluid bypass flow in the magnetically non-energizable passageway 22. This bypass fluid flow in the magnetically non-energizable passageway 22 along with the fluid flow in the magnetically energizable passageway 20 results in a reduced level of damping when the magnetorheological damper 10 is stroked in compression. The physical size restriction of the holes 74 (which form a portion of the magnetically non-energizable passageway 22) limit bypass flow to a level such that changes in the magnetic field 76 still have a significant effect on total fluid flow through the magnetorheological piston 14.

The foregoing description of several expressions of an embodiment of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

What is claimed is:

1. A magnetorheological damper comprising:
    a) a cylinder having first and second ends; and
    b) a magnetorheological piston disposed within and slideably engaging the cylinder, wherein the magnetorheological piston includes a magnetically energizable passageway and a magnetically non-energizable passageway spaced apart from the magnetically energizable passageway, and wherein the magnetorheological piston also includes a pressure and flow control valve disposed to allow pressure-dependent fluid flow in the magnetically non-energizable passageway when the magnetorheological piston slides towards the first end of the cylinder.

2. The magnetorheological damper of claim 1, also including a rod having a first end attached to the magnetorheological piston and having a second end extending outside the cylinder, wherein the second end of the cylinder is disposed between the first and second ends of the rod, and wherein the rod contains an electrode operatively connected to the magnetorheological piston.

3. The magnetorheological damper of claim 1, wherein the valve has a check-valve member disposed to block fluid flow in the magnetically non-energizable passageway when the magnetorheological piston slides away from the first end of the cylinder, and wherein the valve has a spring member operatively engaging the check-valve member to allow pressure-dependent fluid flow in the magnetically non-energizable passageway when the magnetorheological piston slides towards the first end of the cylinder.

4. The magnetorheological damper of claim 1, wherein the valve blocks fluid flow in the magnetically non-energizable passageway when the magnetorheological piston slides away from the first end of the cylinder.

5. The magnetorheological damper of claim 1, wherein the magnetically energizable passageway is a valveless passageway.

6. The magnetorheological damper of claim 5, wherein the valve blocks fluid flow in the magnetically non-energizable passageway when the magnetorheological piston slides away from the first end of the cylinder.

7. The magnetorheological damper of claim 6, wherein the valve has a check-valve member disposed to block fluid flow in the magnetically non-energizable passageway when the magnetorheological piston slides away from the first end of the cylinder, and wherein the valve has a spring member operatively engaging the check-valve member to allow pressure-dependent fluid flow in the magnetically non-energizable passageway when the magnetorheological piston slides towards the first end of the cylinder.

8. A magnetorheological damper comprising:
 a) a cylinder having first and second ends;
 b) a magnetorheological piston disposed within and slideably engaging the cylinder, wherein the magnetorheological piston includes a magnetically energizable passageway and a magnetically non-energizable passageway spaced apart from the magnetically energizable passageway, and wherein the magnetorheological piston also includes a pressure and flow control valve disposed to allow pressure-dependent fluid flow in the magnetically non-energizable passageway when the magnetorheological piston slides towards the first end of the cylinder; and
 c) a magnetorheological fluid disposed in the cylinder, wherein a portion of the magnetorheological fluid is disposed in the magnetically energizable and the magnetically non-energizable passageways.

9. The magnetorheological damper of claim 8, also including a rod having a first end attached to the magnetorheological piston and having a second end extending outside the cylinder, wherein the second end of the cylinder is disposed between the first and second ends of the rod, and wherein the rod contains an electrode operatively connected to the magnetorheological piston.

10. The magnetorheological damper of claim 8, wherein the valve has a check-valve member disposed to block fluid flow in the magnetically non-energizable passageway when the magnetorheological piston slides away from the first end of the cylinder, and wherein the valve has a spring member operatively engaging the check-valve member to allow pressure-dependent fluid flow in the magnetically non-energizable passageway when the magnetorheological piston slides towards the first end of the cylinder.

11. The magnetorheological damper of claim 8, wherein the valve blocks fluid flow in the magnetically non-energizable passageway when the magnetorheological piston slides away from the first end of the cylinder magnetically.

12. The magnetorheological damper of claim 8, wherein the magnetically energizable passageway is a valveless passageway.

13. The magnetorheological damper of claim 12, wherein the valve blocks fluid flow in the magnetically non-energizable passageway when the magnetorheological piston slides away from the first end of the cylinder magnetically.

14. The magnetorheological damper of claim 13, wherein the valve has a check-valve member disposed to block fluid flow in the magnetically non-energizable passageway when the magnetorheological piston slides away from the first end of the cylinder, and wherein the valve has a spring member operatively engaging the check-valve member to allow pressure-dependent fluid flow in the magnetically non-energizable passageway when the magnetorheological piston slides towards the first end of the cylinder.

* * * * *